United States Patent [19]

Egawa

[11] Patent Number: 4,837,789
[45] Date of Patent: Jun. 6, 1989

[54] HIGH FREQUENCY DISCHARGE EXCITATION LASER APPARATUS

[75] Inventor: Akira Egawa, Yamanashi, Japan

[73] Assignee: Fanuc Ltd., Yamanashi, Japan

[21] Appl. No.: 207,094

[22] PCT Filed: Oct. 15, 1987

[86] PCT No.: PCT/JP87/00783

§ 371 Date: May 31, 1988

§ 102(e) Date: May 31, 1988

[87] PCT Pub. No.: WO88/02938

PCT Pub. Date: Apr. 21, 1988

[30] Foreign Application Priority Data

Oct. 15, 1986 [JP] Japan .................. 61-243212

[51] Int. Cl.⁴ .............................................. H01S 3/097
[52] U.S. Cl. ........................................... 372/82; 372/38
[58] Field of Search ................ 372/38, 82; 378/55

[56] References Cited

U.S. PATENT DOCUMENTS

| | | | |
|---|---|---|---|
| 4,375,690 | 3/1983 | Tabata et al. | 372/82 |
| 4,510,606 | 4/1985 | Yagi et al. | 378/38 |
| 4,618,961 | 10/1986 | Sutter, Jr. | 372/82 |
| 4,706,252 | 10/1987 | Egawa et al. | 372/38 |

*Primary Examiner*—Leon Scott, Jr.
*Attorney, Agent, or Firm*—Armstrong, Nikaido, Marmelstein, Kubovcik & Murray

[57] ABSTRACT

A high frequency discharge excitation laser apparatus, wherein the frequency of the drive power source of the laser tube is selected to a range of from 1 Megahertz to 10 Megahertz.

In this case, the said drive power source may be constructed by solid state elements, said laser tube may be comprised of a quartz tube, and the wall thickness thereof is selected to a range of from 1 mm to 10 mm.

3 Claims, 1 Drawing Sheet

HIGH FREQUENCY DISCHARGE EXCITATION LASER APPARATUS

DESCRIPTION

Technical Field

The present invention relates to a gas laser apparatus, more particularly relates to a high frequency discharge excitation laser apparatus.

BACKGROUND ART

In the prior art of this type of gas laser, for example, a carbon dioxide gas laser apparatus, a pair of metal electrodes are arranged at the two sides of a glass discharge tube of a predetermined length and a DC high voltage of, for example, 10 kV to 30 kV, is applied between said pair of metal electrodes via a predetermined series resistor (for setting the operating point in the discharge characteristics), thus imparting a predetermined energy to the carbon dioxide gas (in actuality, a mixture of $N_2$-He-$CO_2$ is used) existing in the discharge tube. When the transition of the energy level of the gas molecules excited to the predetermined energy level in this way to a predetermined lower energy level occurs, laser light of a predetermined wavelength is generated. The laser light successively generated in this way travels back and forth between the reflecting mirrors provided at the two ends of the discharge tube for a predetermined laser oscillation. Note that the above-mentioned gas medium existing in the discharge tube is continually circulated through a circulation pump and coolant heat exchanger. Further, part is exhausted and replaced with fresh gas.

However, in a gas laser producing apparatus excited by DC high voltage, the gap length becomes longer due to the metal electrodes being disposed in the longitudinal direction of the glass discharge tube at the two ends thereof, requiring a high voltage, as mentioned above, and therefore making ensurement of insulation of the power source apparatus itself difficult. Further, along with this, the power source apparatus becomes large in size. Further, under said high voltage, the controllability for controlling the discharge voltage and discharge current to predetermined values required for stabilization of the laser output becomes poor and a high resistance series resistor is required for setting the discharge characteristics to a predetermined operating point, as mentioned above, whereby the loss due to power consumption increases, and further, consumption of the metal electrodes provided in the discharge tube and fouling of the discharge tube due to sputtering thereof, and other problems arise.

On the other hand, as a means to resolve the above problems, there has been proposed a gas laser producing apparatus of the so-called silent discharge excitation method, using an AC power source with a frequency of less than several hundred kilohertz, instead of the above-mentioned DC power source. In this case, a pair of electrodes are disposed at an interval of about several tens of millimeters, for example, in a predetermined gas under reduced pressure. A dielectric is placed inside each of the said electrodes and an AC voltage in the above-mentioned frequency range is applied between the electrodes. That is, specifically speaking, a ceramic tube is used for the dielectric. A pair of metal electrodes are disposed opposing each other on the outer surface of the ceramic tube along the longitudinal direction thereof. An AC voltage in the above-mentioned frequency range is applied between the pair of metal electrodes. Note that in the same way as the above-mentioned DC power source drive, reflecting mirrors are provided at the two ends of the ceramic tube (laser tube) and the gas medium in the laser tube (in the same way as the above, use if made of $N_2$-He-$CO_2$ gas) is circulated.

In this case, the ions or electrons ionized in the gas medium move to the electrode side of the predetermined polarity and accumulate on the insulator provided on the inside thereof. Each time the polarity of the AC voltage changes, they move to the opposing electrode side. Current flows intermittently only when such changes in polarity occur. Therefore, the power injected into the gas medium per unit volume increases, when the applied voltage is constant, since the higher the frequency of the AC voltage, the greater the current flowing between the electrodes (this point may be explained from the fact that the ceramic tube acts as a capacitive impedance with respect to the AC voltage and, therefore, the higher the frequency, the lower the impedance). Along with this, the output power also increases (conversely, the apparatus required for obtaining a set output power can be made smaller). However, the upper limit on the frequency at which the above-mentioned silent discharge occurs is several hundred kilohertz at the most.

Further, the ceramic tube used for gas laser producing apparatuses of the said silent discharge excitation type have a large dielectric loss angle (tan δ) and therefore the higher the frequency of the said AC power source, the greater the dielectric loss and thus the higher the temperature, which finally causes dielectric breakdown of the ceramic tube. Therefore, when a ceramic tube is used as the laser tube, due to the restriction on the withstand voltage, there is the problem that the power source frequency cannot be increased that much. Of course, as a countermeasure, it is conceivable to use a quartz tube or another dielectric with a low dielectric loss, but in this case, in said frequency range, the impedance of the dielectric becomes too high and sufficient injected power requested for laser generation cannot be obtained. Therefore, in the silent discharge region, it is essential to use the above-mentioned ceramic tube etc. as the dielectric.

Further, it has been proposed to use a so-called radio frequency of a frequency of, for example, 13.56 Megahertz or 27 Megahertz or even higher as the drive power source of the gas laser producing apparatus. That is, when using such a high frequency, the period of change of the polarity of voltage mentioned above becomes extremely short, so during that interval the ionized ions or electrons will not reach the predetermined electrode, but continually repeatedly travel back and forth between the electrodes. This switching of the charge movement causes a continuous high frequency current (continuous current advanced in phase from the high frequency voltage impressed) to flow between the electrodes, and discharge of a different mode from the above intermittant discharge is performed. In this case, the percentage to which the gas medium can be raised to the predetermined excitation level with respect to a predetermined injected power increases, and the efficiency of laser light generation can be raised. However, in the above-mentioned frequency region, it is difficult to make the large output power source required for this type of laser light producing apparatus (in particular the high frequency inverter portion) with, for example, transistors and other solid state elements. Use must be made of vacuum tubes. In the final analysis, despite the power source frequency being raised and the efficiency improved, there is the separate problem that the power source apparatus ends up large in size.

Further, when use is made of a drive power source of a radio frequency, use is also made of quartz tubes, with their low dielectric losses, as the laser tubes, but under such a high frequency, the impedance of the quartz tubes becomes too low and, therefore, unless the said quartz tube is made thick, the discharge current will end up concentrating at local areas and fabrication will become difficult. Further, the current passing through the tube wall of said thickness separate from the discharge space will increase, whereby the loss due to the same will increase, posing other problems. Further, in such frequency regions, problems occur of radio interference, and thus there are problems of higher costs due to the shielding etc. to deal with the same, the larger size of apparatuses, etc.

DISCLOSURE OF THE INVENTION

The present invention was made to resolve the above problems and has as its object the raising of the frequency of the drive power source higher than the frequency of the power source used for a gas laser producing apparatus of the above-mentioned silent discharge excitation type (to make it the range of radio frequency) to raise the efficiency of the laser light generation with respect to the injected power and further to select the frequency range of the said drive power source to enable construction of the power source of this type of gas laser producing apparatus (in particular the high frequency inverter portion) by solid state elements (for example, by MOS FET's).

Further, the present invention has as another object the use of a quartz tube (quartz glass tube) with a low dielectric loss as the laser tube to ensure the discharge required for laser light generation under the above predetermined frequency range, the drastic reduction of the dielectric loss compared to the abovementioned ceramic tube to eliminate the restriction of insulation withstand voltage due to the rise of the frequency, and the elimination of the need to make the said quartz tube very thick.

To achieve the above-mentioned objects, the present invention provides a gas laser apparatus in which the frequency of the drive power source of the laser tube is selected to a range of from 1 Megahertz to 10 Megahertz.

According to the above construction, the efficiency of laser light generation with respect to a predetermined injected power rises and it becomes possible to reduce the size of the laser light producing apparatus required for obtaining a predetermined laser light output. Further, it is possible to construct the power source apparatus (in particular the high frequency inverter portion) by, for example, MOS transistors and other solid state elements, so reduction of the size of the power source apparatus can be achieved. Therefore, it is possible to simultaneously achieve efficiency of generation of laser light with respect to a predetermined injected power and reduced size of the apparatus as a whole, including the power source apparatus.

By using a quartz tube with a low dielectric loss as a laser tube, excellent discharge in the said frequency region is performed by application of the predetermined voltage. Further, since the dielectric loss is low, the restrictions on withstand voltage on the above-mentioned ceramic tube are eliminated even in the abovementioned frequency range and, further, there is no need to make the tube that thick in the abovementioned frequency region.

BEST MODE FOR CARRYING OUT THE INVENTION

Figure 1:
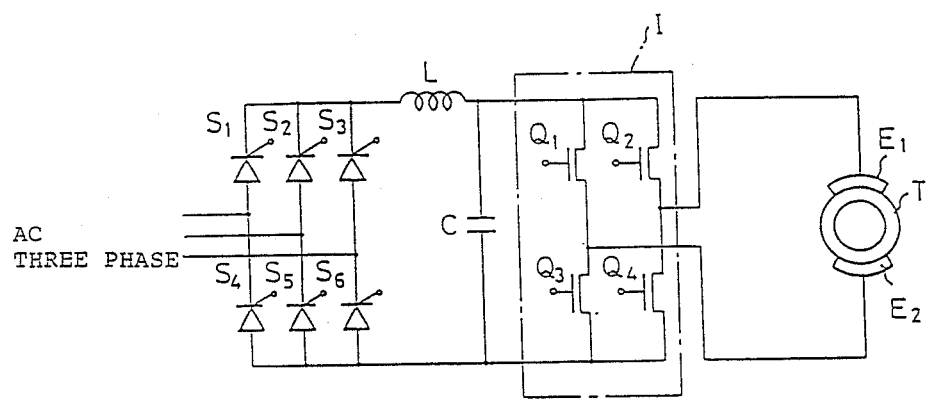
FIG. 1 is a view showing the overall constitution of a gas laser producing apparatus according to an embodiment of the present invention and FIGS. 2(a) and FIG. 2(b) are views showing the characteristics in the case of use of a quartz tube compared with the case of use of a ceramic tube as the laser tube used for the apparatus of FIG. 1.

FIG. 1 shows the constitution of a gas laser producing apparatus according to an embodiment of the present invention. A three-phase AC voltage is converted into a predetermined DC voltage through an LC circuit by a full-wave rectifier circuit comprised of thyristors $S_1$ to $S_6$, to which are supplied gate signals of predetermined phases from a predetermined control circuit.

Reference symbol I is a high frequency inverter, which is comprised of bridge connected MOS transistors $Q_1$ to $Q_4$. Control signals (A phase control signals) of a predetermined frequency (in the case of the present invention, 1 Megahertz to 10 Megahertz) are supplied to gates of the transistors $Q_1$ and $Q_4$ from a predetermined drive circuit. On the other hand, the gates of the remaining transistors $Q_2$ and $Q_3$ are supplied with control signals (B phase control signals) with the same frequency as above and differing in phase by 180°. By this, a high frequency voltage of the region of the above-mentioned frequency (radio frequency of a range of from 1 Megahertz to 10 Megahertz) is supplied between the electrodes $E_1$ and $E_2$ of the laser tube T (comprised by quartz tube of predetermined wall thickness as mentioned above). By this, a predetermined high frequency discharge occurs in the gas medium in the laser tube, the gas molecules are excited, and laser light is generated.

In this case, in the present invention, the frequency of the said drive power source is raised to the radio frequency of the above-mentioned frequency range, so continuous high frequency current flows between the said electrodes and the efficiency of laser light generation rises with respect to a predetermined injected power. Further, the injected power per unit volume in the case where the impressed voltage is kept constant also rises and the output power rises. Therefore, the laser light producing apparatus necessary for obtaining a fixed output power can be made smaller in size. Note that, clearly, as the frequency becomes higher, it is possible to make smaller inductive elements (coils or transistors), the capacitive elements (capacitors), and other constituent components.

Further, in the present invention, by selecting the frequency of the above-mentioned drive power source as a range of 1 Megahertz to 10 Megahertz, it is possible to construct the power source apparatus, in particular the high frequency inverter portion I, by solid state elements (in particular the MOS FET's $Q_1$ to $Q_4$), so it is possible to make the power source apparatus far smaller compared with the case of constructing the high frequency inverter portion by vacuum tubes.

Further, by selecting the frequency of the drive power source in the above-mentioned range, it is possible to use a quartz tube as the laser tube and obtain excellent discharge by application of a predetermined voltage and to eliminate the restrictions in withstand voltage accompanying a rise in frequency. Further, the tube wall no longer has to be made that thick. In this way, it is possible to suppress the decline in the power efficiency and to improve the reliability considerably.

Figures 2A, 2B:
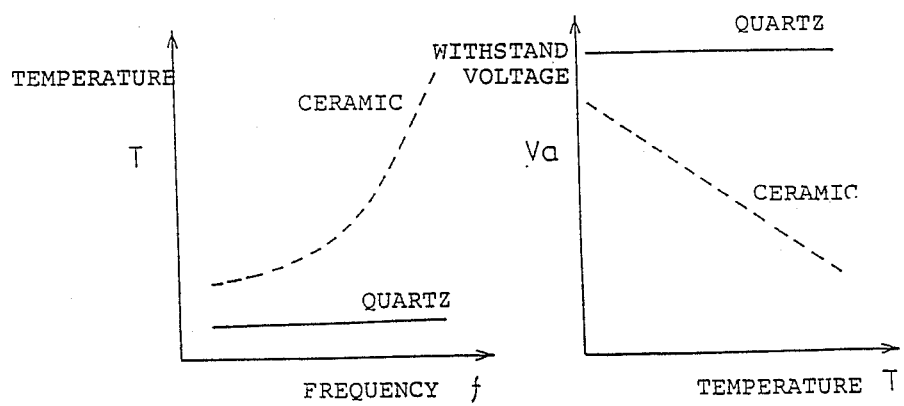

FIG. 2 shows the operating characteristics in the case of use of a ceramic tube and use of a quartz tube as the laser tube. FIG. 2(a) shows the frequency-temperature characteristics of the laser tube, with the dotted line showing the use of a ceramic tube and the solid line showing the use of a quartz tube. Further, FIG. 2(b) shows the temperature-withstand voltage characteristics of the laser tube, the dotted line showing the use of a ceramic tube and the solid line showing the use of a quartz tube.

As shown in FIG. 2, the ceramic tube has a high dielectric loss, so the loss rises along with rises in frequency, causing rises in temperature (see FIG. 2(a)). Along with this, the withstand voltage falls (see FIG. 2(b)), so there are restrictions of the withstand voltage and, despite the frequency rise, sufficient output cannot be obtained.

On the other hand, the quartz tube used in the present invention has a low dielectric constant $\epsilon$ (about $\frac{1}{3}$ of the above-mentioned ceramic tube), so with a low frequency, the impedance is high and the predetermined discharge cannot be caused unless a high voltage is applied, but in the high frequency region such as used in the present invention, the impedance drops and a predetermined discharge can be caused reliably by application of a predetermined voltage. Further, since the above-mentioned dielectric loss is also low, despite the rise in frequency, the loss remains almost the same and there is no temperature rise (see FIG. 2(a)). Therefore, the withstand voltage does not fall much at all (see FIG. 2(b)) and there is no restriction of withstand voltage such as in the above-mentioned ceramic tube.

Further, as mentioned in regard to the abovementioned prior art, when the power source frequency is raised to 13.56 Megahertz or more, the impedance of the quartz tube becomes too low and, therefore, the wall thickness must be increased or else the discharge current will concentrate locally or the current flowing through the tube wall will rise and thus invite a decline in the power efficiency, but in the frequency range such as in the present invention, the wall thickness does not have to be made that great (for example, the wall thickness may be made 1 mm in the case of a frequency of 1 Megahertz or the wall thickness may be made 10 mm in the case of a frequency of 10 Megahertz), thus enabling the problem of wall thickness of the prior art mentioned above to be resolved. Note that if the wall thickness of the quartz tube is made too thin, the impedance will become too low, the current density will rise, and the heat generation will increase. Further, it is necessary to ensure a predetermined mechanical strength. Therefore, at the minimum, a wall thickness of 1 mm is required.

Note that the present invention can be applied not only to carbon dioxide gas lasers, but also He-Ne, CO (carbon monoxide), excimer, and all other gas lasers.

According to the present invention, it is possible to raise the efficiency of generation of laser light with respect to a predetermined injected power and to reduce the size of the laser light producing apparatus required for obtaining a predetermined output power and further to construct the power source apparatus (in particular the high frequency inverter portion) by solid state elements and thereby achieve a smaller size of the power source apparatus itself. Further, it is possible to use a quartz tube, with its low power loss, as the discharge tube material, thus giving the very advantageous effects of increasing the efficiency of the apparatus, improving the reliability, etc.

What is claimed is:

1. A high frequency discharge excitation laser apparatus, comprising a drive power source of a laser tube having a high frequency range of at least 1 Megahertz but less than 10 Megahertz.

2. A high frequency discharge excitation laser apparatus according to claim 1, wherein the said drive power source is constructed by solid state elements.

3. A high frequency discharge excitation laser apparatus according to claim 1, wherein said laser tube is comprised of a quartz tube provided with electrodes and the wall thickness thereof is selected to a range of from 1 mm to 10 mm.

* * * * *